Jan. 9, 1962
G. C. DEVOL ETAL
COINCIDENCE DETECTORS
3,016,465
Filed Feb. 15, 1956
2 Sheets-Sheet 1
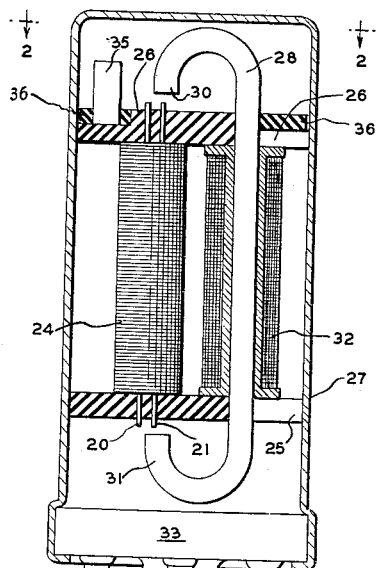
FIG. 1
FIG. 10
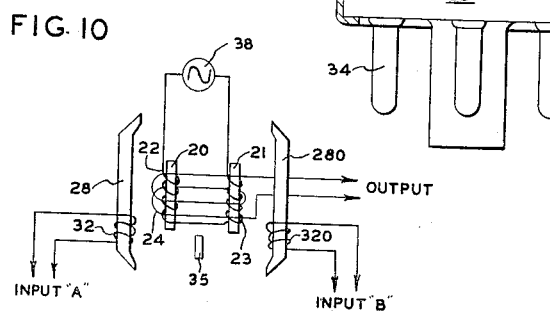
FIG. 11
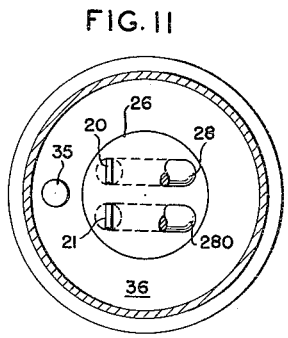
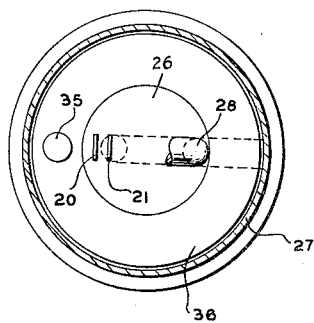
FIG. 2
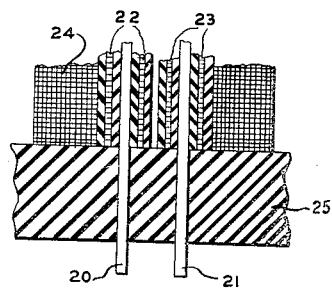
FIG. 3

Jan. 9, 1962
G. C. DEVOL ETAL
COINCIDENCE DETECTORS
3,016,465
Filed Feb. 15, 1956
2 Sheets-Sheet 2
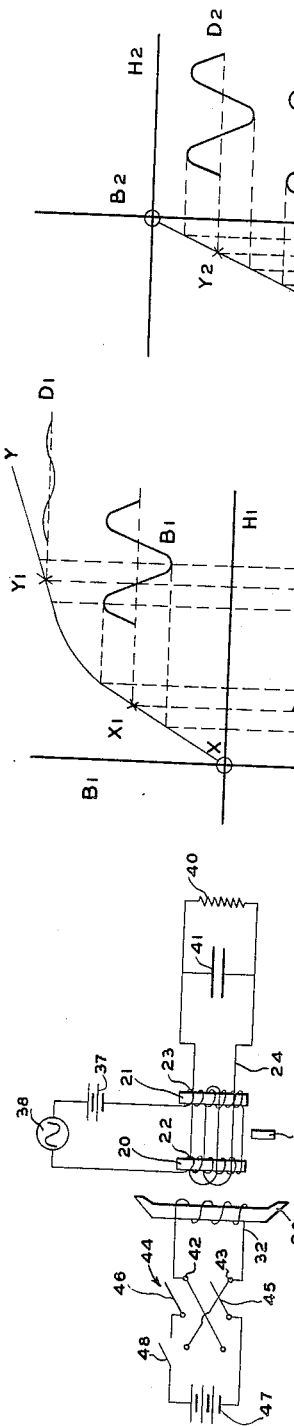
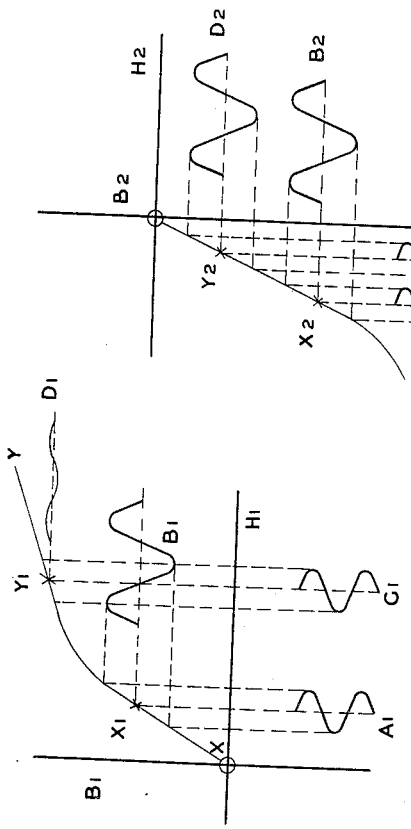
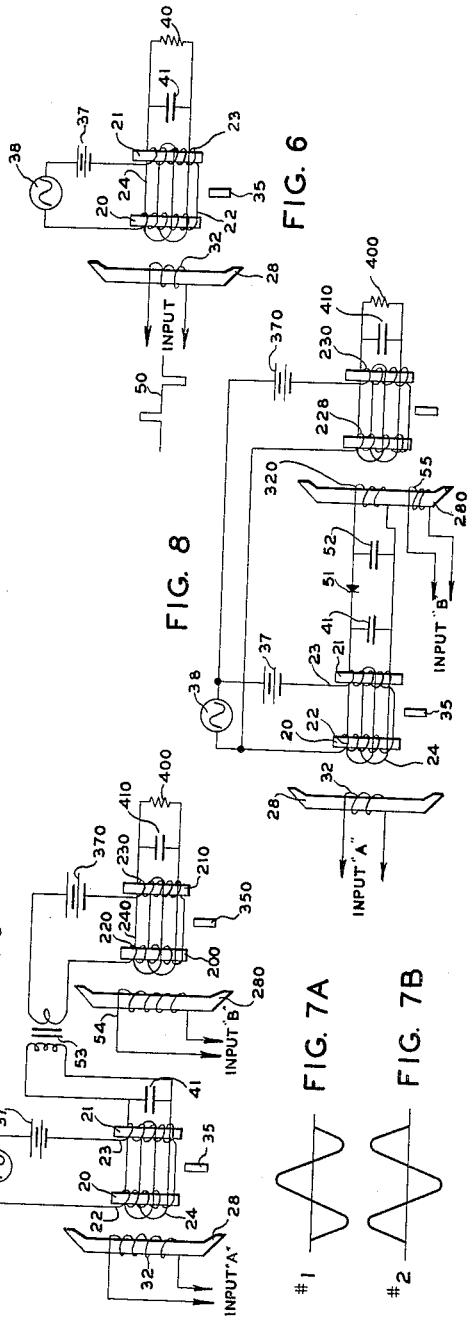

3,016,465
Patented Jan. 9, 1962

3,016,465
COINCIDENCE DETECTORS
George C. Devol, Greenwich, Conn., and Erik B. Hansell, deceased, late of South Norwalk, Conn., by Marjorie B. Hansell, administratrix, South Norwalk, Conn.; said Marjorie B. Hansell assignor to said George C. Devol
Filed Feb. 15, 1956, Ser. No. 565,611
21 Claims. (Cl. 307—88)

This invention relates to improvements in electrical circuits utilizing control by magnetic fields.

In copending application Serial No. 161,702 filed May 12, 1950 (now U.S. Patent 2,741,757) in the names of the same inventors named herein, there is disclosed and claimed a novel storage device in which information represented by a sustained or transient directional electric impulse may be magnetically stored and utilized in a novel manner, with numerous resulting advantages.

This application is a continuation-in-part of said application Serial No. 161,702. The present invention, also disclosed but not claimed in that application, is concerned with novel systems of utilizing multiple information bits. The device in said copending application both in the form there claimed and in specially modified form, is utilized herein to special advantage for the purpose of correlating plural signal currents.

The present invention has as an object the correlation of multiple information bits by novel magnetic devices.

In more specific aspect, the present invention has as an object the detection of the presence of a particular class of information bit among multiple information sources. A further specific object of the present invention is to detect the unanimity of all the information bits among multiple information sources, as being of the same class. A still further specific but nonetheless important object of this invention is the provision of novel forms of coincidence detectors, to evidence a match between two sets of information bits where each set may contain bits of opposite sign or sense.

The foregoing objects and further advantages and features of novelty will be appreciated more fully from the detailed description of several embodiments of the invention in its various aspects. In the description, reference is made to the accompanying drawings, wherein:

FIG. 1 is a vertical view, partly in section taken through a preferred form of a magnetic control unit;

FIG. 2 is a horizontal section along the line 2—2 of FIG. 1 of the magnetic control unit;

FIG. 3 is an enlarged section of a portion of transformer cores showing the mounting and coil windings thereof;

FIG. 4 is a schematic diagram of a switch controlled version of the magnetic control device illustrating the principle of operation;

FIG. 5A is a graph of the B—H function of one core of the device in FIGS. 1–4 showing the input and output of different bias points;

FIG. 5B is a similar graph for the other core of the device of FIGS. 1–4;

FIG. 6 is a schematic diagram of a pulse controlled version of the magnetic control device;

FIG. 7A is a graph of the output of the device shown in FIG. 4 with one setting of the reversing switch;

FIG. 7B is a graph of the output of the device shown in FIG. 4 with the other setting of the reversing switch;

FIGS. 8, 9 and 10 are diagrams of various forms of information correlation devices and systems utilizing the form of magnetic storage device described in connection with the foregoing figures; and FIG. 11 is a view like FIG. 2 of the device in FIG. 1 modified to illustrate one form of physical device in accordance with FIG. 10.

Referring to the drawings in detail and in particular to FIG. 1, in a preferred embodiment of a control device especially suited to the present invention, a pair of parallel transformer cores 20 and 21 is provided each wound with a respective coil 22 and 23 and both wound with a third coil 24. The cores 20 and 21 are rigidly mounted in discs 25 and 26 of insulating material which are in turn mounted in a magnetic shield 27 such as the metal envelope of a vacuum tube of receiver type. The discs 25 and 26 also support a C shaped piece of magnetic material 28, wound with a coil 32 and having its ends 30 and 31 aligned with the ends of the core 21. Leads are brought out from the coils 22, 23, 24 and 32 through the seal 33 by pins 34 in the manner used in vacuum tube construction. A small permanent magnet 35 is mounted in a ring of insulating material 36 set in a recess in the disc 26 and adjusted, before sealing, to properly bias and align the magnetic fields of the cores 20, 21 and 28.

This device may be used in a circuit such as that shown in FIG. 4 to illustrate the principle of operation. The cores 20 and 21 with their respective coils 22 and 23 are so wound and connected as to produce fluxes in opposition so that, when connected in series with a battery 37 and a source of cyclically varying current 38, no voltage will be induced in the secondary winding 24 connected to the load circuit 40 across the capacity 41. The permanent magnet 35 may be adjusted in position to achieve this effect. In an alternative application, magnet 35 may be adjusted to give a biasing flux to produce an output in the absence of a signal, thus acting as a bias. The C shaped core 28 is wound with a coil 32 connected across the outer terminals 42 and 43 of a double pole double throw reversing switch 44. The arms 45 and 46 of the reversing switch are connected across a source of D.C. voltage 47 with a single pole, single throw switch 48 in one side of the circuit. With switches 44 and 48 closed, voltage is applied across the winding 32 to produce a flux in the core 28.

The basic curve XY, in FIG. 5A represents the B—H curve of the core 20 and coil 22. The points $X^1$ and $Y^1$, represent different bias points. This bias is the magnetic bias in core 20, produced largely by the direct current from battery 37 in coil 22. The sine waves $A^1$ and $C^1$ represent a form of cyclically varying excitation voltage supplied by the generator 38. It will be noted that the B—H curve has a sharp knee in it between the points $X^1$ and $Y^1$, which is characteristic of the material of which the cores 20 and 21 are made. When the initial bias is set at point $X^1$, and cyclically varying voltage $A^1$ is fed to the coil 22 an output voltage $B^1$ appears across the secondary coil 24. When the bias is changed to a point $Y^1$ past the knee of the B—H curve and the same cyclically varying voltage $C^1$ is applied, a voltage $D^1$ is obtained across the secondary coil 24 that is considerably smaller. This change is effected, for example, by closing switches 44 and 48, thereby to change the resultant magnetic bias in core 20. FIG. 5B shows a similar curve for core 21 and coil 23 except that the B—H curve appears in the third quadrant because of the way the coil 23 is wound. Points $X^2$ and $Y^2$ are shown below the knee. Point $X^2$ is the initial magnetic bias in core 21 corresponding to point $X^1$ in FIG. 5A, produced largely by the direct current in coil 23. Point $Y^2$ is the magnetic bias in core 21 corresponding to point $Y^1$ in FIG. 5A, produced for example when switches 44 and 48 are closed for shifting the bias in core 20 from $X^1$ to $Y^1$. The point $Y^2$ is closer to the origin than point $X^2$ because, to the extent that changed flux from core 28 may thread through core 21, it opposes the initial bias. In the example considered, point $Y^1$ shows that core 20 is subjected to a magnetic increment from core 28. The same change in core 28 produces a decreased magnetic flux in core 21 since the sense of coil 22 is opposite that of coil 23. As with coil 22, the cyclically varying voltage $A^2$ applied to coil 23 produces an output voltage $B^2$, and a cyclically varying voltage $C^2$ when applied to coil 23 biased to point $Y^2$, produces an output voltage $D^2$ across the secondary coil 24.

When there is no magnetic flux or equal magnetic flux density in both cores 20 and 21 in opposing directions, no voltage is induced in coil 24. When either magnet 35 or the magnetism in core 28 is such as to produce more flux in core 20 than core 21, or vice versa, a voltage will be induced in the coil 24. This voltage is of a phase dependent upon which core 20 or 21 is carrying the greater flux, that is, depending upon which core has been biased beyond the knee of its B—H curve.

When core 28 is initially magnetized a current of a certain phase will be produced in the secondary coil 24. With switch 48 closed and with adequate voltage in supply 47, the polarity of core 28 can be reversed repeatedly.

The core 28 which is advantageously of magnetically retentive material, also referred to herein as semipermanent material. Such a core may be used to produce a storage effect in the conditions for producing a certain output, once set up by a signal, are retained after the signal and exciting current have stopped. D.C. voltage source 47 and the switches 44 and 48 may be eliminated and a source of positive or negative pulses or of square square waves may be substituted as shown in FIG. 6 where the source of pulses 50 is substituted for the D.C. source 47 and switches 44 and 48. With this arrangement the permanent magnet 35 may be positioned either to cause a voltage to be induced in the secondary 24 when there is no pulse in the winding 32 or to produce an unbalance in the flux paths and hence a voltage in the secondary 24 under these conditions. In this case the permanent magnet 35 may be said to act as a bias. The magnet 35 does not need to be magnetized to have this effect and need only be of magnetic material. However, the effect will be considerably greater if it is magnetized.

FIG. 7A shows a graph of the output of the device shown in FIG. 4 with one setting of the reversing switch or of the device shown in FIG. 6 with a positive pulse, for instance, applied to the coil 32. In FIG. 7B it is shown that the reversal of the switch in the circuit of FIG. 4, or the presence of a negative pulse across the coil 32, will have the effect of reversing the phase of the output.

Two or more of the devices shown in FIG. 6 can be cascaded in either the circuit shown in FIG. 8 or in the circuit shown in FIG. 9.

In the circuit shown in FIG. 8 the output of the secondary winding 24 of the first stage is connected through a rectifier 51 to a control winding 320 on the control core of the second stage. There may be an additional control winding to give a coincidence effect, or, still better, each of the cascaded stages may have dual cores 28 as in FIG. 10 to be explained in detail. The source of cyclically varying exciting current is common to the coils 22 and 23 of the first stage and 228 and 230 of the second stage. There is an additional capacitor 52 connected across the control winding 320 of the second stage with the rectifier connected in series in the high side of the line between the two capacitors. The oscillating winding of each stage has a separate D.C. supply 37, 370 so that its bias point may be separately adjusted.

In the circuit of FIG. 9 the output of the first stage is coupled through a transformer 53 to the exciting windings 220 and 230 of the second stage. Again the bias supplies 37 and 370 for the exciting windings of the stages are independent. There may be a winding 54 on the control core 280 of the second stage connected to a second control circuit for coincidence effects or the control core may be a permanent magnet to give bias.

The signal appears at the output end 400, 410 of the circuit in FIG. 9; but no signal appears unless both cores 28 and 280 are magnetized. If output does not appear, it may be due to lack of input at either core; or both cores may have had no input. This is a form of logical "and" circuit, to indicate that each one of a number of events have occurred. The same apparatus can be made as an "or" circuit simply by arranging magnets 35 to pre-bias each of the units rather than to balance each of the units in FIG. 9 as just described. In that case, if either control core were to be magnetized to buck the bias of magnet 35, no output would appear at the load end 400, 410 of the system.

In the embodiment of FIG. 10, two control cores 28 and 280 are employed with a single magnetic-field responsive transformer, being one form of magnetometer, and sometimes referred to herein as a transducer. The two cores 20 and 21 are of highly permeable, thin, readily saturable magnetic material. One winding having two portions 22 and 23 extends about both cores 20 and 21. Another winding 24 has portions extending about both cores. The latter winding obviously may be in the form of a single coil about both cores where the two cores are close to each other; but the winding 24 may have two distinctly separate portions about the respective cores, as in the case of winding 22, 23. In either case, the coils about one core are alike in sense and the coils about the other core are mutually opposite in sense. Where the cores 20 and 21 are in the same assembly, a bar of magnetic material 35, permanently magnetized if required, can be used to adjust balance when cores 28 and 280 are not magnetized. Coils 22 and 23 as one winding are energized by cyclically varying voltage source 38; and any output obtained is induced in winding 24. A bias supply 37 as in the other figures is here contemplated if the higher sensitivity is desired or for other reasons; or a separate pair of appropriately polarized D.C. energized coils on cores 20 and 21 may be used.

In operation, it may be assumed at the start that both control cores 28 and 280 are unmagnetized. They may be rendered so by A.C. high frequency erase excitation in coils 32 and 320 or in separate erase coils on the control cores if these be assumed to be of retentive magnetic material. In this starting condition, the entire coil and core assembly is balanced, with effectively no net output coupling between winding 22, 23 and winding 24.

If a signal input is applied to coil 32 on core 28, unbalance develops and a large output appears. However if both coils 32 and 320 magnetize cores 28 and 280, both cores 20 and 21 are driven to saturation, and again the output drops to a negligible value, compared to that yielded with only one magnetized core 32 or 320. This result is an especially valuable feature of the device. Indication of match is obtained with virtually the same response when both control cores are magnetized and when both control cores are unmagnetized. A very different response indicating mismatch is obtained when either one but not both of the control cores is magnetized. This result is accomplished whether cores 28 and 280 are of high magnetic retentivity or of low or negligible residual magnetism, both conditions being broadly within the concepts of the present invention. However where those cores are of high retentivity, the information can be supplied to coils 32 and 320 either sequentially or simultaneously for subsequent comparison. Furthermore, the detection of match or mismatch does not disturb or erase the components of information, in the form of the magnetic states of cores 28 and 280. Finally, the condition of one of these cores can be retained while the magnetic condition of the other is changed in a sequence of coincidence detection operations.

The unit shown in FIG. 10 is but an element in a much larger system as would ordinarily be used in coincidence detection. Several units of this form may readily be grouped for detection of coincidence between a combination of multiple "A" input signals (impressed on respective coils 32) and a combination of multiple "B" signals (impressed on respective coils 320). The output coils of the several units are then coupled to common output terminals, as by connecting the output coils 24 in series or by connecting the output coils to multiple coils on a single-core device as on core 280 in FIG. 8, or any other suitable circuit may be used for combining the output signals of multiple FIG. 10 units in detection of group coincidence. Where large numbers of units are used in single coincidence circuit, a suitable circuit may be desirable for suppressing the low-level output of the units where "match" is indicated. All of the "A" signals (whether for magnetizing cores 28 or leaving them unmagnetized) applied to a group of units like in FIG. 10 may represent a reference pattern, while the "B" signals (for cores 280) may represent an unknown to be compared to the reference pattern.

FIG. 11 shows an embodiment of the detector of FIG. 10 in all respects like the unit of FIGS. 1 to 3, except that in FIG. 10 two C-shaped control cores 28 and 280 are shown, each with the ends thereof aligned with a respective saturable core 20 or 21, where only one C-shaped core appears in the embodiment of FIGS. 1 to 3. This represents a unitary coincidence detector. The proximity of the cores 20 and 21 to each other as shown has certain evident advantages, but this is not to be taken as limiting. Cores 20 and 21 can be separated from each other, together with their respective winding portions, to operate far apart. In that event each such unit should be equipped with a magnetic shield such as that on the device of FIGS. 1 to 3.

In both forms of the coincidence detector just described, the air gap between core 28 (280) and the opposite saturable core 20 (21) promotes isolation of the storage core from the magnetometer core, thus reducing any tendency of the magnetometer excitation to erase the stored magnetization.

As in the devices of FIGS. 4, 6, 8 and 9, individual bias coils and bias supply for the two saturable cores can be employed for improved sensitivity, and for coincidence detectors of the unitary form as in FIG. 11, reduced interaction can be realized through the use of bias. The parallel-extending cores 20 and 21 may have opposite polarity so that as one is shifted further toward saturation, the other shifted away from saturation, considering only weak, stray fields. The control cores should then be arranged or polarized when magnetized so as to shift its related saturable core toward saturation. Under such conditions, any stray field reaching the other core would have no harmful effect.

The foregoing illustrative disclosure is obviously susceptible of application in various combinations and is capable of varied modification by those skilled in the art without departing from the novel concepts disclosed; and consequently the invention should be broadly construed in a manner consistent with its spirit and scope.

What is claimed is:

1. A coincidence detector, including in a unitary assembly, an enclosing magnetic shield, a dual magnetometer enclosed therein having a pair of magnetically sensitive portions, said dual magnetometer being adapted to respond in one manner to a magnetic field impressed on either of said portions and to respond in a different manner to magnetic fields impressed on both of said portions as well as magnetic fields at neither of said portions, respective magnetic field-producing elements disposed to impress respective magnetic fields on said portions, and separate and mutually independent information sources for energizing the respective magnetic field-producing elements with respective signals whose coincidence or lack of coincidence is to be detected.

2. A coincidence detector, including a unitary assembly of an enclosing magnetic shield, a dual magnetometer enclosed therein having spaced magnetically sensitive portions and adapted to respond to a magnetic field at either of said portions in one manner and to respond to a magnetic field at neither of said portions as well as at both of said portions in a different manner, and a pair of separate information sources including separate control coils effective when energized to establish magnetic fields at said portions, respectively.

3. A coincidence detector in accordance with claim 2, wherein said coils are wound around semipermanent magnetic cores fixed in relation to said dual magnetometer.

4. A coincidence detector, including transducing means having a saturable magnetic core structure having different portions, a pair of windings on said core structure including an exciting winding and an output winding, one of said windings including two portions having, respectively, equal and opposite coupling to the other of said windings, the two portions of said one winding being arranged relative to said other of said windings and to said different portions of said core structure so that there is substantially no output in said output winding in response to excitation in said exciting winding in the absence of unbalanced core saturation, a pair of separate magnetic field-imposing elements associated with said core structure effective concurrently to develop balanced core saturation in said different portions of said core structure, said elements being individually effective to develop in said different portions of said core structure an unbalanced saturation thereby to produce high output in response to individual actuation of said elements and low output in response to actuation of either both of said elements or neither of said elements and a pair of selectively operable mutually independent information sources for controlling said magnetic field-imposing elements, respectively.

5. A coincidence detector, including a pair of saturable magnetic cores of high permeability having a sharp knee in the saturation curve thereof, and including first and second windings on said cores with each winding having a portion thereof extending about a respective one of said cores, the winding portions on one of said cores being in the same sense and the winding portions on the other of said cores being of mutually opposite sense, said cores and said windings being arranged to be balanced in the absence of directional magnetic fields in said cores so that excitation of one of said windings produces substantially no output from the other of said windings, separate information sources for said cores including respective magnetic field imposing means operable to cause saturation selectively of neithter one or of either one, or of both of said cores, high output being produced from one of said windings in response to excitation of the other of said windings only when one of said cores is driven into saturation while the other is not.

6. A magnetic transducer in accordance with claim 5, further including means providing magnetic bias partway toward saturation, in each of said cores, each of said magnetic field imposing means being polarized in the sense to aid the bias in the corresponding core.

7. A coincidence detector, including a pair of saturable magnetic cores of high permeability having a sharp knee in the saturation curve thereof, and including first and second windings on said cores with each winding having a portion thereof extending about a respective one of said cores, the winding portions on one of said cores being in the same sense and the winding portions on the other of said cores being of mutually opposite sense, said cores and said windings being arranged to be balanced in the absence of directional magnetic fields in said cores so that excitation of one of said windings produces substantially no output from the other of said windings, and a pair of separate and mutually independent selectively operable information sources and a pair of magnetic devices controlled by said information sources, respectively, each of said cores being disposed, respectively, in position to respond to a respective one of said devices, said windings and said cores remaining balanced when said devices are magnetically alike, and said windings and cores being unbalanced when said magnetic devices are magnetically different and substantial output then being produced from one of said windings in response to excitation of the other of said windings.

8. A coincidence detector, including a pair of saturable magnetic cores of high permeability having a sharp knee in the saturation curve thereof, and including first and second windings about said cores with each winding having a portion thereof extending about a respective core, the winding portions on one of said cores being in the same sense and the winding portions on the other of said cores being of mutually opposite sense, said cores and said windings being arranged to be balanced in the absence of directional magnetic fields in said cores so that excitation of one of said windings produces substantially no output from the other of said windings, a pair of separate and independent information-supplying devices for said cores including respective selectively operable magnetic devices each including a core and a coil thereon, the core of at least one of said devices being of semipermanent magnetic material, said pair of saturable magnetic cores being associated with a respective one of said selectively operable devices to respond to the magnetic condition thereof, high output being obtained from one of said windings in response to excitation of the other of said windings only when one of said devices is magnetized while the other is not.

9. A coincidence detector, including a pair of saturable magnetic cores of high permeability having a sharp knee in the saturation curve thereof, and including first and second windings on said cores with each winding having a portion thereof extending about a respective core, the winding portions about one of said cores being in the same sense and the winding portions about the other of said cores being of mutually opposite sense, said cores and windings being balanced in the absence of saturating directional magnetic fields in either of said cores so that excitation of one of said windings produces substantially no output from the other of said windings, means for magnetically biasing each of said cores partway toward saturation, a first information-supplying means selectively operable to impose a magnetic field on one of said cores of the same polarity as the bias therein and additional information-supplying means selectively operable to impose a magnetic field on the other of said cores of the same polarity as the bias therein, thereby to cause saturation of neither one of said cores or of a respective one of said cores or of both said cores, high output being obtained from one of said windings in response to excitation of the other of said windings only when one only of said cores is driven into saturation.

10. A coincidence detector in accordance with claim 9, wherein at least one of said selectively operable means includes a semipermanent magnetic core and a winding thereon.

11. A coincidence detector having a pair of windings including one winding divided into two portions, two saturable magnetic elements, each element forming a portion of the magnetic circuit through a respective one of said two winding portions, said two portions of said one of said windings having equal and opposite coupling to the other of said windings in the absence of unequal unidirectional magnetic fields in said magnetic elements, and a pair of separate information-supplying devices including respective magnetic field-imposing elements associated at least predominantly with a respective one of said two saturable elements and operable to develop balanced saturation therein, said magnetic field-imposing elements being individually effective to develop unbalanced saturation in said saturable elements, whereby excitation of one of said windings produces high output from the other of said windings only in response to individual actuation of said elements.

12. A coincidence detector, including a pair of mutually independent and selectively operable information sources, a pair of saturable magnetic components, respective windings coupled to said components, and electric exciting means therefor, said windings and said cores being balanced in the absence of imposed magnetic field for providing substantially equal response to impressed electric excitation, said information sources each having a magnetic field impressing means in control relation to a respective one of said magnetic components, and output connections to said windings arranged to cause mutual cancellation of the responses of said windings to excitation when no magnetic field is impressed on said magnetic elements by said magnetic field-impressing means, the latter being arranged to maintain cancellation of said responses when both information sources cause unidirectional magnetic fields to be impressed on said saturable components, whereby substantial uncancelled output is obtained at said connections only when one, but not both, of said information sources causes a magnetic field to be impressed on its related saturable component, and magnetic means biasing said saturable magnetic components partway toward saturation in the aiding polarity relative to the pair of magnetic field-impressing means, respectively.

13. A coincidence detector in accordance with claim 12, wherein at least one of said information sources includes a semipermanent magnetic core element and a winding thereon.

14. A coincidence detector including a pair of magnetically sensitive devices adapted to produce an electrical output in response to magnetic input, two separate information sources selectively operable for providing magnetic input to said devices, respectively, and means to convert the electrical output, if any, from one of said devices to a magnetic input to the other of said devices in the sense to cancel the selectively-provided magnetic input thereto so as to evidence coincidence both when no magnetic input is provided to either of said devices and when both devices have selectively provided magnetic input.

15. A coincidence detector including first and second parts of saturable ferromagnetic material, means to detect unequal magnetization therein, said means including exciting signal means and a pair of windings about said saturable parts, respectively, and separate selectively operable mutually independent means for imposing respective information representing magnetic fields on said saturable parts, said last-named means including at least one semipermanent magnetic part, a winding thereon and an information signal source connected to said winding.

16. A coincidence detector including like first and second parts of saturable magnetic material, means for detecting magnetic unbalance between said magnetic parts including means for impressing like varying magnetomotive forces on such parts and thereby driving such parts through portions of their magnetization curves, winding means about said parts having induced therein signals representing the magnetic conditions in said magnetic parts, said magnetic parts and said unbalance detecting means being constructed so that the induced signals are equal and opposite both when said magnetic parts are undisturbed and when said magnetic parts are exposed to like magnetic changes, and separate information sources for said magnetic parts including respective magnetic elements each associated at least predominantly with a respective one of said magnetic parts for impressing successively changing information thereon magnetically.

17. A coincidence detector including a first part of saturable ferromagnetic material and a winding thereon, a second part of saturable ferromagnetic material and a winding thereon, an excitation signal source for providing magnetizing current variations for driving said parts through at least a portion of their magnetization curve, unbalance detecting means coupled to said windings and arranged to provide substantially no output when said ferromagnetic parts are in like magnetic states, both when neither part has a sustained magnetic field therein and when both parts have like magnetic fields therein and said unbalance detecting means being effective to produce an output in response to different conditions of magnetization in said ferromagnetic parts, a pair of signal input windings disposed to impress information-representing magnetic fields on said saturable ferromagnetic parts, respectively, and separate information sources connected to said pair of input windings.

18. A coincidence detector in accordance with claim 17, including a semi-permanent magnetic core in at least one of said signal input windings.

19. Coincidence detection apparatus including a first electrically excited, magnetically sensitive device of the balanced type that produces no significant output in the absence of a uni-directional magnetic field, electrical exciting means therefor, a selectively operable information source including magnetic field impressing means in control relation to said first magnetically sensitive device, a second electrically excited magnetically-sensitive device of the balanced type that produces no significant output in the absence of a uni-directional magnetic field, a second selectively operable information source including magnetic field impressing means in control relation to said second device, and electrical exciting means for said second magnetically sensitive device having input connections from the output of said first device, whereby output from said second device occurs only in response to information input causing magnetic fields to be impressed on both said magnetically sensitive devices.

20. A coincidence detector, including a pair of mutually independent and selectively operable information sources, a pair of saturable magnetic components, respective windings coupled to said components, and electric exciting means therefor, said windings and said cores being balanced in the absence of imposed magnetic field for providing substantially equal response to impressed electric excitation, said information sources each having a magnetic field impressing means in control relation to a respective one of said magnetic components, and output connections to said windings arranged to cause mutual cancellation of the responses of said windings to excitation when no magnetic field is impressed on said magnetic elements by said magnetic field-impressing means, the latter being arranged to maintain cancellation of said responses when both information sources cause uni-directional magnetic fields to be impressed on said saturable components, whereby substantial uncancelled output is obtained at said connections only when one, but not both, of said information sources causes a magnetic field to be impressed on its related saturable component.

21. A coincidence detector including first and second electrically excited magnetometer devices responsive to respective impressed magnetic fields, means connecting said devices in the sense to cause mutual output cancellation in the absence of a control magnetic field on either one of said magnetometer devices, said devices also being arranged to have mutually cancelling output when like magnetic fields are impressed on both, whereby substantial uncancelled output is obtained only when one only of said devices has a magnetic field impressed thereon, and a pair of mutually independent selectively operable sources of information, each including uni-directional magnetic field impressing means coupled individually to respective ones of said magnetometer devices.

References Cited in the file of this patent

UNITED STATES PATENTS

| | | |
|---|---|---|
| 2,332,879 | Weis | Oct. 26, 1943 |
| 2,409,719 | Sorensen | Oct. 22, 1946 |
| 2,430,457 | Dimond | Nov. 11, 1947 |
| 2,559,513 | Palmer | July 3, 1951 |
| 2,608,621 | Peterson | Aug. 26, 1952 |
| 2,628,346 | Burkhardt | Feb. 10, 1953 |
| 2,695,993 | Haynes | Nov. 30, 1954 |
| 2,725,549 | Dunnet | Nov. 29, 1955 |